US011180180B2

(12) United States Patent
Pattok et al.

(10) Patent No.: US 11,180,180 B2
(45) Date of Patent: *Nov. 23, 2021

(54) COUNTER ROTATION STEERING WHEEL

(71) Applicant: Steering Solutions IP Holding Corporation, Saginaw, MI (US)

(72) Inventors: Eric D. Pattok, Frankenmuth, MI (US); Joen C. Bodtker, Gaines, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/741,295

(22) Filed: Jan. 13, 2020

(65) Prior Publication Data

US 2020/0148251 A1 May 14, 2020

Related U.S. Application Data

(63) Continuation of application No. 15/142,623, filed on Apr. 29, 2016, now Pat. No. 10,589,774.

(60) Provisional application No. 62/155,589, filed on May 1, 2015.

(51) Int. Cl.
*B62D 1/22* (2006.01)
*B62D 5/00* (2006.01)

(52) U.S. Cl.
CPC ............... *B62D 1/22* (2013.01); *B62D 5/008* (2013.01)

(58) Field of Classification Search
CPC ............ B62D 1/20; B62D 1/22; B62D 5/008
See application file for complete search history.

(56) References Cited

U.S. PATENT DOCUMENTS

| 2017/0151975 | A1* | 6/2017 | Schmidt | B62D 1/183 |
| 2018/0079442 | A1* | 3/2018 | Lubischer | B62D 1/183 |
| 2019/0077438 | A1* | 3/2019 | Collier | B62D 1/183 |
| 2020/0148249 | A1* | 5/2020 | Lubischer | B62D 1/183 |

* cited by examiner

*Primary Examiner* — James A English
(74) *Attorney, Agent, or Firm* — Dickinson Wright PLLC

(57) ABSTRACT

A steering column assembly includes a steering column shaft having a first end and a second end. The steering column assembly also includes an intermediate shaft coupled to the steering column shaft first end. The steering column assembly further includes a steering input pinion coupled to the intermediate shaft. The steering column assembly yet further includes a counter rotation mechanism causing a non-rotational condition of at least a portion of the steering shaft via counter rotational movement of the steering column assembly during rotation of the steering input pinion.

13 Claims, 1 Drawing Sheet

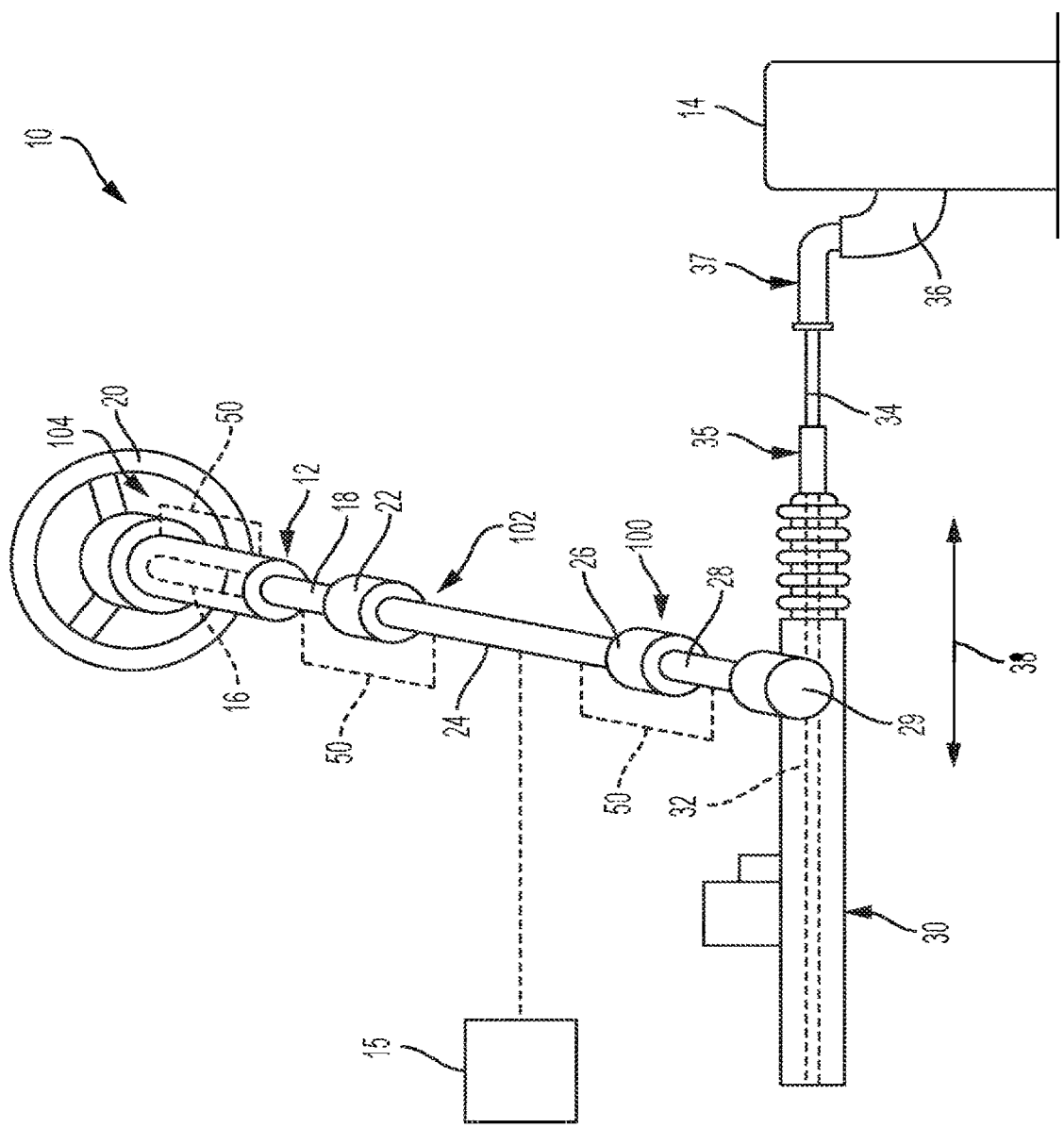

COUNTER ROTATION STEERING WHEEL

CROSS REFERENCE TO RELATED APPLICATION

This patent application claims priority to U.S. patent application Ser. No. 15/142,623, filed Apr. 29, 2016, which claims priority to U.S. Provisional Patent Application Ser. No. 62/155,589, filed May 1, 2015, each of which is incorporated herein by reference in its entirety.

BACKGROUND

The disclosure herein relates to steering column assemblies and, more specifically, to a steering column assembly with anti-rotation features.

When some vehicles are fitted with systems that allow the vehicle to be driven autonomously, the steering system(s) operate while the steering wheel may be required to rotate while the vehicle is in an autonomous driving mode. The steering wheel may be utilized for non-driving functions (e.g., tray table), but rotation of the steering wheel limits such functionality. "De-clutching" the wheel, or an associated intermediate component, from a steering gear results in disengagement of the wheel, thereby requiring re-engagement if an operator wishes to manually take control of the vehicle.

SUMMARY OF THE INVENTION

In one embodiment of the disclosure, a steering column assembly includes a steering column shaft having a first end and a second end. The steering column assembly also includes an intermediate shaft coupled to the steering column shaft first end. The steering column assembly further includes a steering input pinion coupled to the intermediate shaft. The steering column assembly yet further includes a counter rotation mechanism causing a non-rotational condition of at least a portion of the steering shaft via counter rotational movement of the steering column assembly during rotation of the steering input pinion.

In another embodiment of the disclosure, a steering column assembly includes a steering column shaft having a first end and a second end. The steering column assembly also includes an intermediate shaft coupled to the first end of the steering column shaft. The steering column assembly further includes a steering gear operatively coupled to an end of the intermediate shaft. The steering column assembly yet further includes a counter rotation mechanism configured to counter rotate rotational movement of at least one of the steering column shaft and the intermediate shaft such that the steering column shaft rotates at the same ratio as the steering gear in the opposite rotational direction as the steering gear to counter rotatively cause a non-rotational condition of the steering column shaft to maintain the steering column shaft in a single angular position during rotation of the steering gear.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of a steering column assembly according to one embodiment of the disclosure.

DETAILED DESCRIPTION

Referring now to the FIGURE, where the invention will be described with reference to specific embodiments, without limiting same, FIG. 1 illustrates an exemplary steering system 10 for use in a vehicle (not shown). Steering system 10 enables the operator of the vehicle to control the direction of the vehicle through the manipulation of a steering column assembly 12, which is mechanically connected to road wheels 14. Steering system 10 may also be equipped with a self-steering mechanism 15 such as an Advanced Driver Assistance System (ADAS) or the like.

Steering column assembly 12 generally includes an upper column shaft 16, a lower column shaft 18, a steering wheel 20, an intermediate shaft 24, and a steering gear assembly 30. In the exemplary embodiment, steering wheel 20 is disposed at upper column shaft 16, and steering column assembly 12 is movable between a deployed position and a stowed position. In the deployed position, the operator can apply a rotational force to steering column assembly 12. In the stowed position, portions of steering column assembly 12 such as steering wheel 20 are disposed away from the driver toward a vehicle instrument panel (not shown), which provides increased space for the driver.

A column universal joint 22 couples the lower column shaft 18 to the intermediate shaft 24, which is secured at its other end to a lower column universal joint 26. A pinion shaft 28 is coupled at one end to universal joint 26 and to a pinion gear 29 of steering gear assembly 30 at the other end. Gear assembly 30 also includes an elongate rack 32, and the opposed axial ends of rack 32 are coupled to the vehicle's road wheels 14 (only one shown) through steering linkage that includes tie rods 34 (only one shown) each secured to rack 32 at an inner tie rod end 35, and to one of a pair of steering knuckles 36 (only one shown) at an outer tie rod end 37.

When the vehicle operator turns steering wheel 20 or self-steering mechanism 15 turns some portion of steering column assembly 12, a rotational force is applied to rotate pinion gear 29. The movement of pinion gear 29 causes substantially linear movement of rack 32 in the direction of arrows 38, which in turn manipulates tie rods 34 and knuckles 36 in order to reposition road wheels 14.

In the exemplary embodiment, steering system 10 includes a counter rotation mechanism 50 that is configured to counter-rotate a portion of steering column assembly 12 when the vehicle is in an autonomous, semi-autonomous, or selectively autonomous driving mode, such that no rotation of steering wheel 20 is caused by operation of pinion gear 29. For example, counter rotation mechanism 50 may be a mechanism such as that described in U.S. Pat. No. 6,955,623, the contents of which are incorporated herein by reference in entirety.

Counter rotation mechanism 50 is operably coupled to steering column assembly 12 to actively apply opposite rotation to steering wheel 20 to give the impression that wheel 20 is "locked out" (i.e., not moving). System 10 may include more than one counter rotation mechanism 50 in some embodiments. Counter rotation mechanism 50 may be operably coupled to steering column assembly 12 at various locations in certain embodiments. In some embodiments, mechanism 50 is disposed in a first location 100 between intermediate shaft 24 and pinion gear 29. In other embodiments, a second location 102 for the counter rotation mechanism 50 is between intermediate shaft 24 and steering column shaft 18. In other embodiments, a third location 104 for the counter rotation mechanism 50 is between steering column shaft 16 and steering wheel 20.

In alternative embodiment, counter rotation mechanism 50 may interpose the counter motion within a shaft. For example, mechanism 50 may be disposed within intermediate shaft 24, or within shafts 16, 18.

Accordingly, the disclosure provides steering column assemblies with a counter-rotation mechanism for a vehicle equipped with an Advanced Driver Assistance System (ADAS) or the like.

In one embodiment, the steering system enables the steering wheel to be stationary (non-rotating) when in the ADAS mode or self-steering mode, by using the counter rotation mechanism such as an "Active Front Steer" mechanism. As the self-steering mechanism guides the vehicle along its route, the steering gear (e.g., rack & pinion) input shaft rotates. However, the counter rotation mechanism, which may be positioned between the steering column shaft and the gear input shaft, counter-rotates the same or substantially the same degree to cause no visible rotation of the steering wheel to the operator.

Accordingly, the counter rotation mechanism actively applies opposite rotation to the wheel to give the impression the wheel is not rotating and not engaged to column shaft 16. As such, one advantage is that the wheel and steering system is always available for taking manual control of the vehicle by an operator.

The counter rotation mechanism may be located between the I-shaft and the steering input pinion, between the I-shaft and the column steering shaft, and/or between the column steering shaft and the wheel. The counter rotation mechanism may also be located to interpose the counter motion within a shaft, such as the I-shaft or the steering shaft, which may require separation of components.

Accordingly, the counter rotation mechanism facilitates variable ratio steering and enables zero ratio steering.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a steering column shaft having a first end and a second end;
an intermediate shaft coupled to the steering column shaft first end;
a steering input pinion coupled to the intermediate shaft; and
a counter rotation mechanism causing a non-rotational condition of at least a portion of the steering shaft via counter rotational movement of the steering column assembly during rotation of the steering input pinion.

2. The steering column assembly of claim 1, wherein the counter rotation mechanism is positioned between the intermediate shaft and the steering input pinion.

3. The steering column assembly of claim 1, wherein the counter rotation mechanism is positioned between the intermediate shaft and the steering column shaft.

4. The steering column assembly of claim 1, wherein the counter rotation mechanism is positioned proximate one of the first end and the second end of the steering column shaft.

5. The steering column assembly of claim 1, wherein the counter rotation mechanism is positioned within the intermediate shaft.

6. The steering column assembly of claim 1, wherein the counter rotation mechanism is positioned within the steering column shaft.

7. The steering column assembly of claim 1, further comprising a self-steering mechanism operably coupled to the steering column assembly, the self-steering mechanism configured to rotate the steering column assembly during an autonomous driving mode.

8. The steering column assembly of claim 1, wherein the steering column assembly is movable between a deployed position where a driver may manually rotate the steering shaft, and a stowed, anti-rotation position where the counter rotation mechanism is active to cause the non-rotational condition of the steering shaft.

9. A steering column assembly comprising:
a steering column shaft having a first end and a second end;
an intermediate shaft coupled to the first end of the steering column shaft;
a steering gear operatively coupled to an end of the intermediate shaft; and
a counter rotation mechanism configured to counter rotate rotational movement of at least one of the steering column shaft and the intermediate shaft such that the steering column shaft rotates at the same ratio as the steering gear in the opposite rotational direction as the steering gear to counter rotatively cause a non-rotational condition of the steering column shaft to maintain the steering column shaft in a single angular position during rotation of the steering gear.

10. The steering column assembly of claim 9, wherein the counter rotation mechanism is disposed within the steering column shaft.

11. The steering column assembly of claim 9, wherein the counter rotation mechanism is disposed within the intermediate shaft.

12. The steering column assembly of claim 9, further comprising a self-steering mechanism operably coupled to the steering column assembly, the self-steering mechanism configured to rotate the steering column assembly during an autonomous driving mode.

13. The steering column assembly of claim 9, wherein the steering column assembly is movable between a deployed position where a driver may manually rotate the steering column shaft, and a stowed, anti-rotation position where the counter rotation mechanism is active to cause the non-rotational condition of the steering column shaft.

* * * * *